US012278436B2

(12) United States Patent
Goto et al.

(10) Patent No.: US 12,278,436 B2
(45) Date of Patent: Apr. 15, 2025

(54) ANTENNA DEVICE AND ARRAY ANTENNA DEVICE

(71) Applicant: Mitsubishi Electric Corporation, Tokyo (JP)

(72) Inventors: Jun Goto, Tokyo (JP); Toru Fukasawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 127 days.

(21) Appl. No.: 17/953,739

(22) Filed: Sep. 27, 2022

(65) Prior Publication Data

US 2023/0019219 A1 Jan. 19, 2023

Related U.S. Application Data

(63) Continuation of application No. PCT/JP2020/021272, filed on May 29, 2020.

(51) Int. Cl.

*H01Q 9/04* (2006.01)
*H01Q 1/48* (2006.01)
*H01Q 21/06* (2006.01)

(52) U.S. Cl.

CPC ............. *H01Q 9/0478* (2013.01); *H01Q 1/48* (2013.01); *H01Q 9/045* (2013.01); *H01Q 21/06* (2013.01)

(58) Field of Classification Search

CPC ... H01Q 9/0407–0414; H01Q 1/38–48; H01Q 9/04; H01Q 13/10

See application file for complete search history.

(56) References Cited

U.S. PATENT DOCUMENTS

| | | | | |
|---|---|---|---|---|
| 6,496,148 | B2 * | 12/2002 | Ngounou Kouam .. | H01Q 5/371 343/846 |
| 7,342,553 | B2 * | 3/2008 | Soler Castany ....... | H01Q 5/371 343/702 |
| 10,957,981 | B2 * | 3/2021 | Yoshitake ............ | H01Q 9/0407 |
| 2010/0295750 | A1 * | 11/2010 | See ...................... | H01Q 9/0435 343/893 |
| 2011/0012790 | A1 * | 1/2011 | Badaruzzaman ...... | H01Q 5/357 343/700 MS |

OTHER PUBLICATIONS

Boskovic et al., "Novel Ku-Band Series-Fed Patch Antenna Array With Enhanced Impedance and Radiation Bandwidth", IEEE Transactions on Antennas and Propagation, Dec. 2018, vol. 66, No. 12, p. 7041-7048.
International Search Report, issued in PCT/JP2020/021272, PCT/ISA/210, dated Aug. 18, 2020.
Written Opinion of the International Searching Authority, issued in PCT/JP2020/021272, PCT/ISA/237, dated Aug. 18, 2020.

* cited by examiner

*Primary Examiner* — Hasan Islam
(74) *Attorney, Agent, or Firm* — Birch, Stewart, Kolasch & Birch, LLP

(57) ABSTRACT

An antenna device includes: a dielectric substrate having a feed line and a radiation unit provided on a first surface and having a ground conductor provided on a second surface opposite to the first surface; and a pair of second slits that is provided on a side of the radiation unit facing a side to which the feed line is connected and expands in directions away from each other toward the side to which the feed line is connected when the first surface is viewed from above.

5 Claims, 5 Drawing Sheets

ANTENNA DEVICE AND ARRAY ANTENNA DEVICE

CROSS REFERENCE TO RELATED APPLICATIONS

This application is a Continuation of PCT International Application No. PCT/JP2020/021272 filed on May 29, 2020, which is hereby expressly incorporated by reference into the present application.

TECHNICAL FIELD

The present disclosure relates to an antenna device having a microstrip array antenna and an array antenna device.

BACKGROUND ART

For example, Non-Patent Literature 1 describes a microstrip antenna in which a feed line and a radiation unit are provided on the front surface of a dielectric substrate, and a ground conductor is provided on the back surface of the dielectric substrate. The microstrip antenna described in Non-Patent Literature 1 has a pair of notch portions in which the radiation unit is notched in parallel to an extended line obtained by extending the feed line from an end of the radiation unit on a side facing a side to which the feed line is connected when the front surface of the dielectric substrate is viewed from above. By having the pair of notch portions, a wideband antenna device is achieved.

CITATION LIST

Non-Patent Literature

Non-Patent Literature 1: N. Boskovic, B. Jokanovic, M. Radovanovic, and N. S. Doncov, "Novel Ku-Band Series-Fed Patch Antenna Array With Enhanced Impedance and Radiation Bandwidth", IEEE Trans. Antennas and Propag., vol. 66, no. 12, pp. 7041-7048, December 2018.

SUMMARY OF INVENTION

Technical Problem

The microstrip antenna described in Non-Patent Literature 1 radiates a polarized wave parallel to the feed line in a boresight direction when excited. However, there is a problem that the level of a cross polarization component orthogonal to the main polarized wave is high on the high frequency band side of the operation frequency band.

The present disclosure has been made to solve the above problems, and an object of the present disclosure is to obtain a wideband antenna device having radiation characteristics in which a level of cross polarization is low.

Solution to Problem

An antenna device according to the present disclosure includes a feed line provided on a first surface of a dielectric; a radiator provided on the first surface of the dielectric and connected with the feed line; a ground conductor provided on a second surface of the dielectric opposite to the first surface; and a pair of notches extending in directions away from each other from an end of the radiator on a side facing a side to which the feed line is connected, toward the feed line when the first surface of the dielectric is viewed from above.

Advantageous Effects of Invention

According to the present disclosure, there is provided a pair of notch portions extending in directions away from each other from an end of the radiation unit on a side facing a side to which the feed line is connected, toward the feed line when the first surface of the dielectric is viewed from above. Since the mode of the electromagnetic field distribution generated in the radiation unit can be adjusted by the pair of notch portions, it is possible to achieve a wideband antenna device having radiation characteristics in which the level of cross polarization is low.

DESCRIPTION OF EMBODIMENTS

First Embodiment

Figure 1:
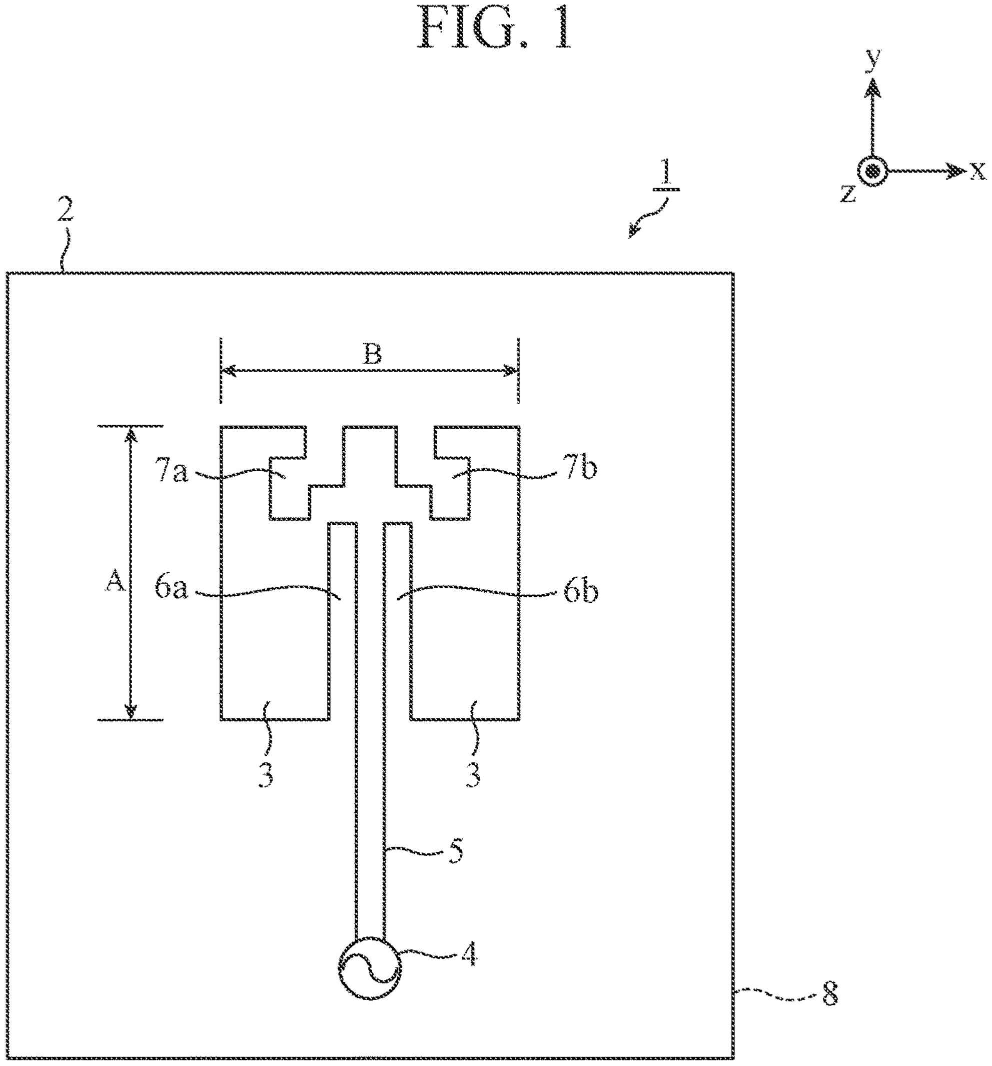
FIG. 1 is a plan view illustrating an antenna device according to a first embodiment.

FIG. 1 is a plan view illustrating an antenna device 1 according to a first embodiment. In FIG. 1, the antenna device 1 is provided on, for example, a dielectric substrate 2. The dielectric substrate 2 is a dielectric in which a radiation unit 3, a power feeding unit 4, and a feed line 5 are provided on a first surface (front surface), and a ground conductor 8 is provided on a second surface (back surface) opposite to the first surface. The radiation unit 3 is a rectangular conductor pattern having a length A in the y direction and a width B in the x direction, and radiates an electromagnetic wave. For example, the power fed to the power feeding unit 4 by an RF connector propagates in the +y direction through the feed line 5 and is input to the radiation unit 3, and part of the power is radiated from the radiation unit 3 as an electromagnetic wave. The remaining power that is not radiated as the electromagnetic wave becomes heat loss inside the radiation unit 3.

First slits 6*a* and 6*b* are provided on the side of the radiation unit 3 to which the feed line 5 is connected. The first slits 6*a* and 6*b* are formed by cutting out the radiation unit 3 along the feed line 5, and are bilaterally symmetrical with respect to the feed line 5. By changing the lengths of the first slits 6*a* and 6*b* in they direction, it is possible to mainly adjust the real part (resistance value) of the input impedance of the antenna device 1. In addition, by changing the widths of the first slits 6*a* and 6*b* in the x direction, it is possible to mainly adjust the imaginary part (reactance value) of the input impedance of the antenna device 1. By changing the sizes of the first slits 6*a* and 6*b* in this manner, impedance matching (matching) of the antenna device 1 is performed, and thus it is possible to minimize reflected waves.

Further, the radiation unit 3 is provided with second slits 7*a* and 7*b*. The second slits 7*a* and 7*b* are a pair of notch portions extending in directions away from each other toward the feed line 5 from the end of the radiation unit 3 on the side facing the side to which the feed line 5 is connected. In FIG. 1, the second slits 7*a* and 7*b* each have a step shape. The mode of the electromagnetic field distribution generated in the radiation unit 3 is adjusted by changing the sizes of the second slits 7*a* and 7*b*.

For example, it is assumed that the conventional antenna device has a structure in which the second slits 7*a* and 7*b* are not provided in the microstrip antenna illustrated in FIG. 1. In the antenna device having this structure, the radiation unit is excited by a mode of electromagnetic field distribution called TM10 mode and operates. The operation frequency band of the TM10 mode is defined by the dielectric constant and the thickness of the dielectric substrate, and is typically a narrow band. Note that the TM10 mode is a mode in which a current is generated in they direction.

It is known that the operation frequency band of the microstrip antenna is widened as the width B of the radiation unit is widened. However, when the width B of the radiation unit is widened, a current in the x direction is generated in a direction other than they direction on the high frequency band side of the operation frequency band, and thus there is a problem that the level of cross polarization becomes high. Note that the main polarization direction of the TM10 mode of the antenna device 1 is the y direction, and the cross-polarized wave is a polarized wave orthogonal to the main polarization direction, that is, a polarized wave in the x direction.

Since the antenna device 1 includes the second slits 7*a* and 7*b*, it is possible to widen the operation frequency band of the TM10 mode and a mode similar to the TM10 mode without widening the width B of the radiation unit 3. In the microstrip antenna, the shape of a radiation conductor changes mode to be generated. In the antenna device 1, since an electric field is generated in a region sandwiched between the second slit 7*a* and the second slit 7*b* in the radiation unit 3, not only the TM10 mode but also a mode similar to the TM10 mode is generated. Characteristics of the antenna device 1 will be described in order to show the usefulness expressed in the antenna device 1 by generation of the TM10 mode and the mode similar to the TM10 mode. Note that it is assumed that the dielectric substrate 2 has a relative permittivity $\varepsilon_r$ of 3.0 and the thickness of 0.026 λ. λ is a wavelength at a used frequency of the antenna device 1. The value of the width B of the radiation unit 3 in the direction orthogonal to the feed line 5 is d.

The antenna device 1 having the second slits 7*a* and 7*b* has $d\sqrt{\varepsilon_r}/\lambda=0.52$ (<0.6). In addition, the conventional antenna device without the second slits 7*a* and 7*b* has $d\sqrt{\varepsilon_r}/\lambda=0.69$ (>0.6). The speed at which the electromagnetic wave propagates in the direction of the width B of the radiation unit is proportional to the square root of the relative permittivity $\varepsilon_r$. The proportionality constant is a value obtained by multiplying the square root of the relative permittivity $\varepsilon_r$ by the width d and then dividing the wavelength λ.

Figure 2:
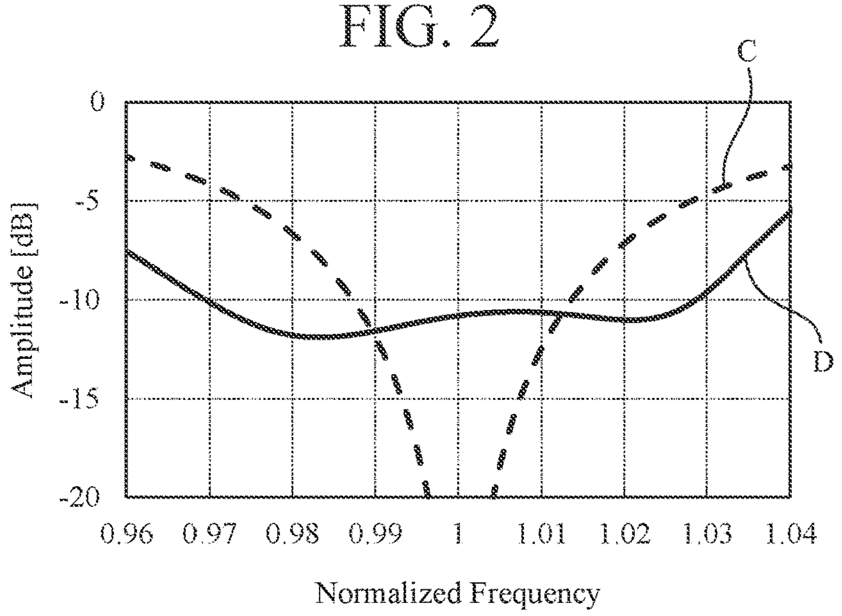
FIG. 2 is a graph illustrating electromagnetic field simulation results of reflection characteristics in the antenna device according to the first embodiment and the conventional antenna device.

FIG. 2 is a graph illustrating electromagnetic field simulation results of reflection characteristics in the antenna device 1 and the conventional antenna device. The conventional antenna device has a structure obtained by removing second slits 7*a* and 7*b* from the antenna device 1 illustrated in FIG. 1. In FIG. 2, a curve C indicates the reflection characteristic of the conventional antenna device operated in the TM10 mode, and a curve D indicates the reflection characteristic of the antenna device 1. As indicated by the curve C, in the conventional antenna device, the fractional bandwidth in which the reflection coefficient is equal to or less than −10 dB remains at a little more than 2%. On the other hand, as indicated by the curve D, in the antenna device 1, the fractional bandwidth in which the reflection coefficient is equal to or less than −10 dB is about 6%, and the band is widened.

Figure 3A:
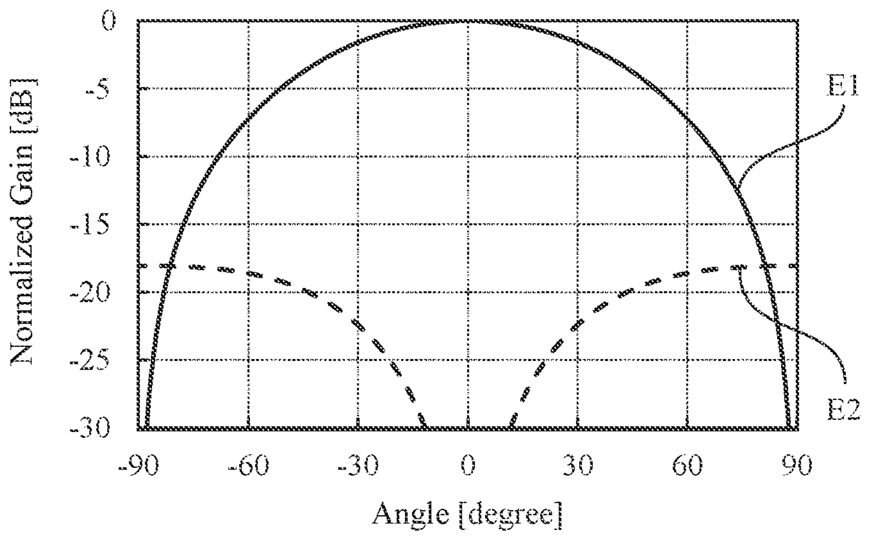
FIG. 3A is a graph illustrating electromagnetic field simulation results of radiation patterns at 0.968 fc of main polarized wave and cross polarized wave radiated from the antenna device according to the first embodiment (fc; center frequency)
Figure 3B:
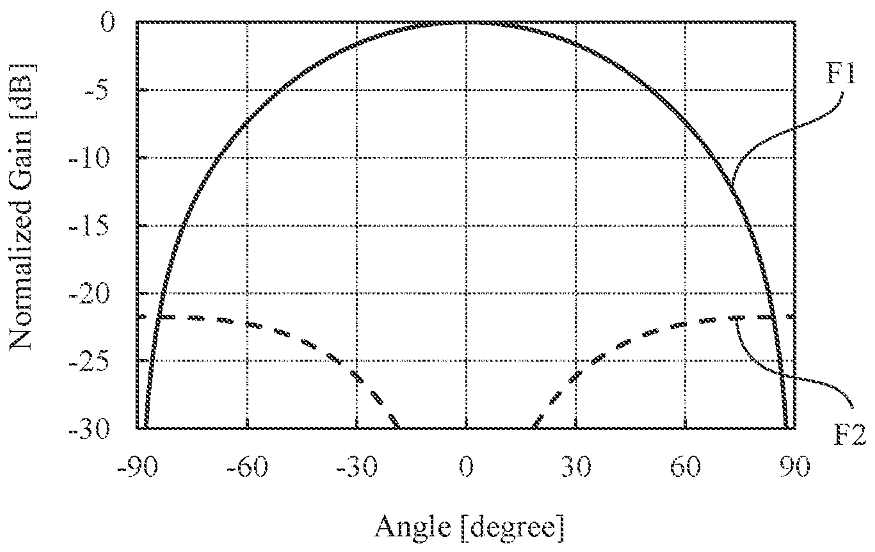
FIG. 3B is a graph illustrating electromagnetic field simulation results of the radiation patterns at 0.980 fc of the main polarized wave and the cross polarized wave radiated from the antenna device according to the first embodiment.

FIG. 3A is a graph illustrating electromagnetic field simulation results of radiation patterns of the main polarized wave and the cross polarized wave radiated from the antenna device 1 at 0.968 fc, where fc is a center frequency of an operation frequency band. A curve E1 is a radiation pattern at 0.968 fc of the main polarized wave, and a curve E2 is a radiation pattern at 0.968 fc of the cross polarized wave. FIG. 3B is a graph illustrating electromagnetic field simulation results of radiation patterns at 0.980 fc of the main polarized wave and the cross polarized wave radiated from the antenna device 1. In FIG. 3B, a curve F1 is a radiation pattern at 0.980 fc of the main polarized wave, and a curve F2 is a radiation pattern at 0.980 fc of the cross polarized wave.

Figure 4A:
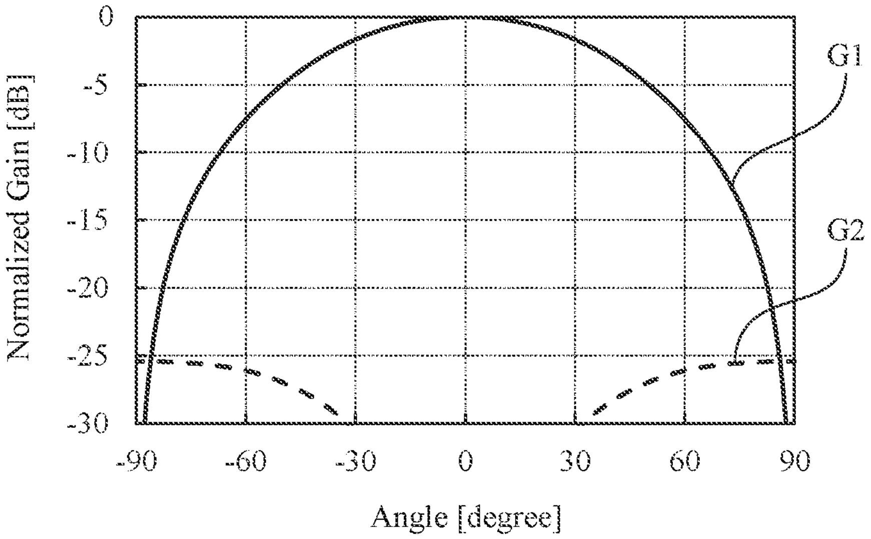
FIG. 4A is a graph illustrating electromagnetic field simulation results of radiation patterns at 0.993 fc of main polarized wave and cross polarized wave radiated from the antenna device according to the first embodiment.
Figure 4B:
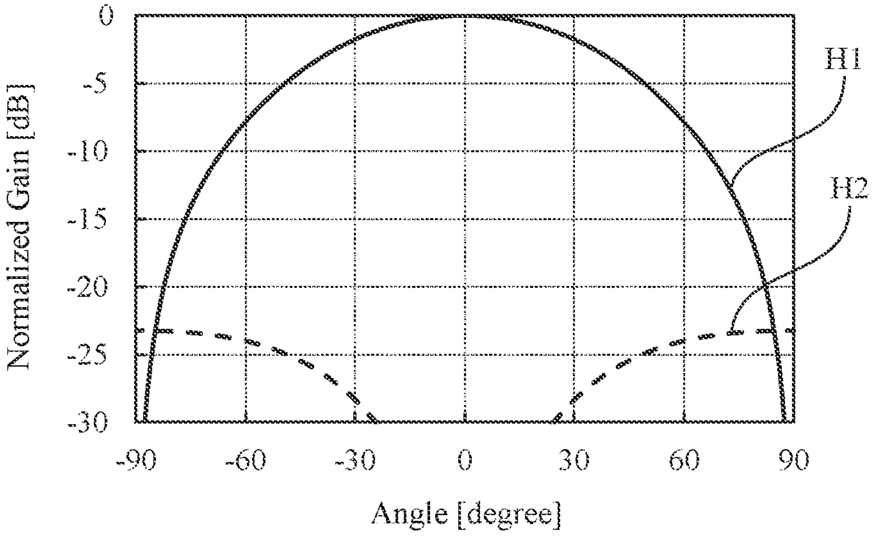
FIG. 4B is a graph illustrating electromagnetic field simulation results of the radiation patterns at 1.006 fc of the main polarized wave and the cross polarized wave radiated from the antenna device according to the first embodiment.

FIG. 4A is a graph illustrating electromagnetic field simulation results of radiation patterns of the main polarized wave and the cross polarized wave radiated from the antenna device 1 at 0.993 fc, where fc is a center frequency of an operation frequency band. A curve G1 is a radiation pattern at 0.993 fc of the main polarized wave, and a curve G2 is a radiation pattern at 0.993 fc of the cross polarized wave. FIG. 4B is a graph illustrating electromagnetic field simulation results of radiation patterns at 1.006 fc of the main polarized wave and the cross polarized wave radiated from the antenna device 1. In FIG. 4B, a curve H1 is a radiation pattern at 1.006 fc of the main polarized wave, and a curve H2 is a radiation pattern at 1.006 fc of the cross polarized wave.

Figure 5A:
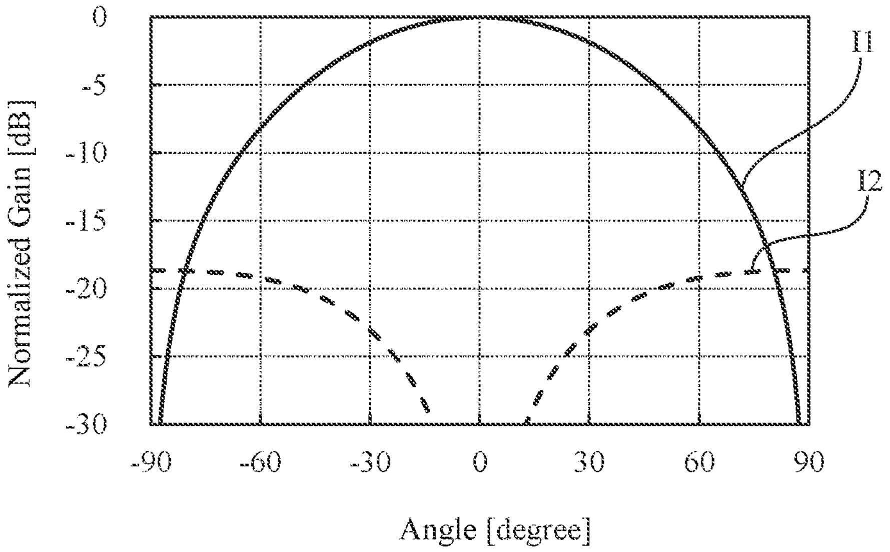
FIG. 5A is a graph illustrating electromagnetic field simulation results of radiation patterns at 1.019 fc of main polarized wave and cross polarized wave radiated from the antenna device according to the first embodiment.
Figure 5B:
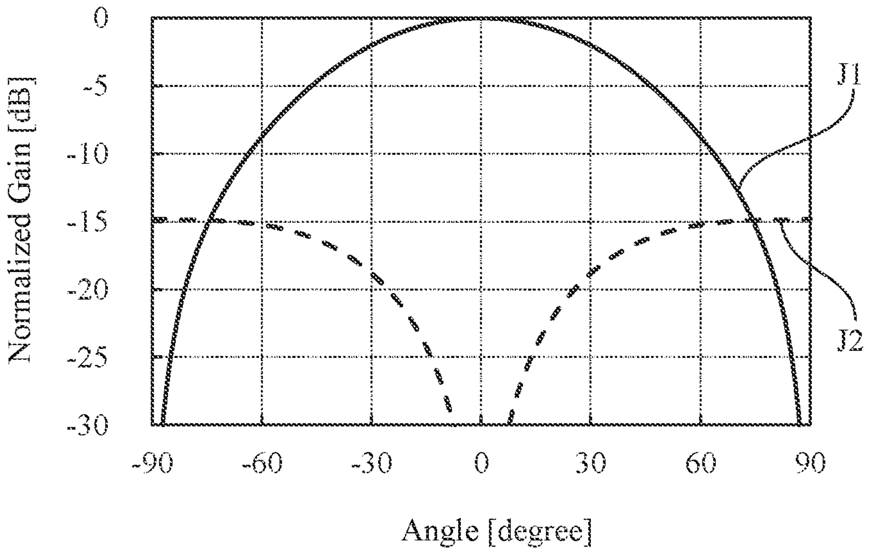
FIG. 5B is a graph illustrating electromagnetic field simulation results of radiation patterns at 1.031 fc of the main polarized wave and the cross polarized wave radiated from the antenna device according to the first embodiment.

FIG. 5A is a graph illustrating electromagnetic field simulation results of radiation patterns of the main polarized wave and the cross polarized wave radiated from the antenna device 1 at 1.019 fc, where fc is a center frequency of an operation frequency band. A curve I1 is a radiation pattern at 1.019 fc of the main polarized wave, and a curve I2 is a radiation pattern at 1.019 fc of the cross polarized wave. FIG. 5B is a graph illustrating electromagnetic field simulation results of radiation patterns at 1.031 fc of the main polarized wave and the cross polarized wave radiated from the antenna device 1. In FIG. 5B, a curve J1 is a radiation pattern at 1.031 fc of the main polarized wave, and a curve J2 is a radiation pattern at 1.031 fc of the cross polarized wave.

In FIGS. 3A, 3B, 4A, 4B, 5A, and 5B, the main polarized wave having the radiation patterns of the curve E1, the curve F1, the curve G1, the curve H1, the curve I1, and the curve J1 is the main polarized wave on the yz plane. That is, it is a y-direction component in the radiation pattern. In addition, the cross-polarized wave having the radiation patterns of the curve E2, the curve F2, the curve G2, the curve H2, the curve I2, and the curve J2 is the cross-polarized wave on the yz plane. That is, it is an x-direction component in the radiation pattern. The angle=0 (degrees) corresponds to the +z direction in the three-dimensional coordinate system illustrated in FIG. 1.

As is clear from FIGS. 3A, 3B, 4A, 4B, 5A, and 5B, the curve E1, the curve F1, the curve G1, the curve H1, the curve I1 and the curve J1 are good antenna patterns directed in the boresight direction, i.e. angle=0 (degrees). On the other hand, the curve E2, the curve F2, the curve G2, the curve H2, the curve I2, and the curve J2 are equal to or less than −15 dB within the range of ±90 degrees, and exhibit good characteristics.

Note that the microstrip antenna described in Non-Patent Literature 1 and having a pair of notch portions in which the radiation unit is notched in parallel to the extended line obtained by extending the feed line generates a cross polarization component higher than −15 dB, and thus the antenna device 1 has better characteristics. This is because the second slits 7*a* and 7*b* formed in the radiation unit 3 extend in directions away from each other from the end of the radiation unit 3 on the side facing the side connected with the feed line 5 toward the feed line 5. That is, when the second slits 7*a* and 7*b* extend in a direction away from each other, for example, in a stepwise manner toward the feed line 5 from the end of the radiation unit 3 on the side facing the side connected with the feed line 5, an electric field is generated in a region sandwiched between the second slit 7*a* and the second slit 7*b* in the radiation unit 3. Due to this electric field, not only the TM10 mode but also a mode similar to the TM10 mode is generated in the antenna device 1. On the other hand, in the microstrip antenna described in Non-Patent Literature 1, a pair of notch portions (notch portions corresponding to the first slits 6*a* and 6*b*) provided on the side of the radiation unit to which the feed line is connected and a pair of notch portions provided at an end of the radiation unit facing the side to which the feed line is connected and in which the radiation unit is notched in parallel to the extended line obtained by extending the feed line are electrically connected. For this reason, in the antenna described in Non-Patent Literature 1, the above-described electric field is not generated, and the mode similar to the TM10 mode is not generated. Therefore, characteristic improvements found in the antenna device 1 cannot be obtained.

From the electromagnetic field simulation results illustrated in FIGS. 2, 3A, 3B, 4A, 4B, 5A, and 5B, in the antenna device 1, the fractional bandwidth where the reflection coefficient is equal to or less than −10 dB is over about 6%, and good characteristics where the cross polarization is equal to or less than −15 dB are obtained. As described above, the antenna device 1 can widen (wideband) the antenna operation gain as compared with the conventional antenna device not including the second slits 7*a* and 7*b*.

Figure 6:
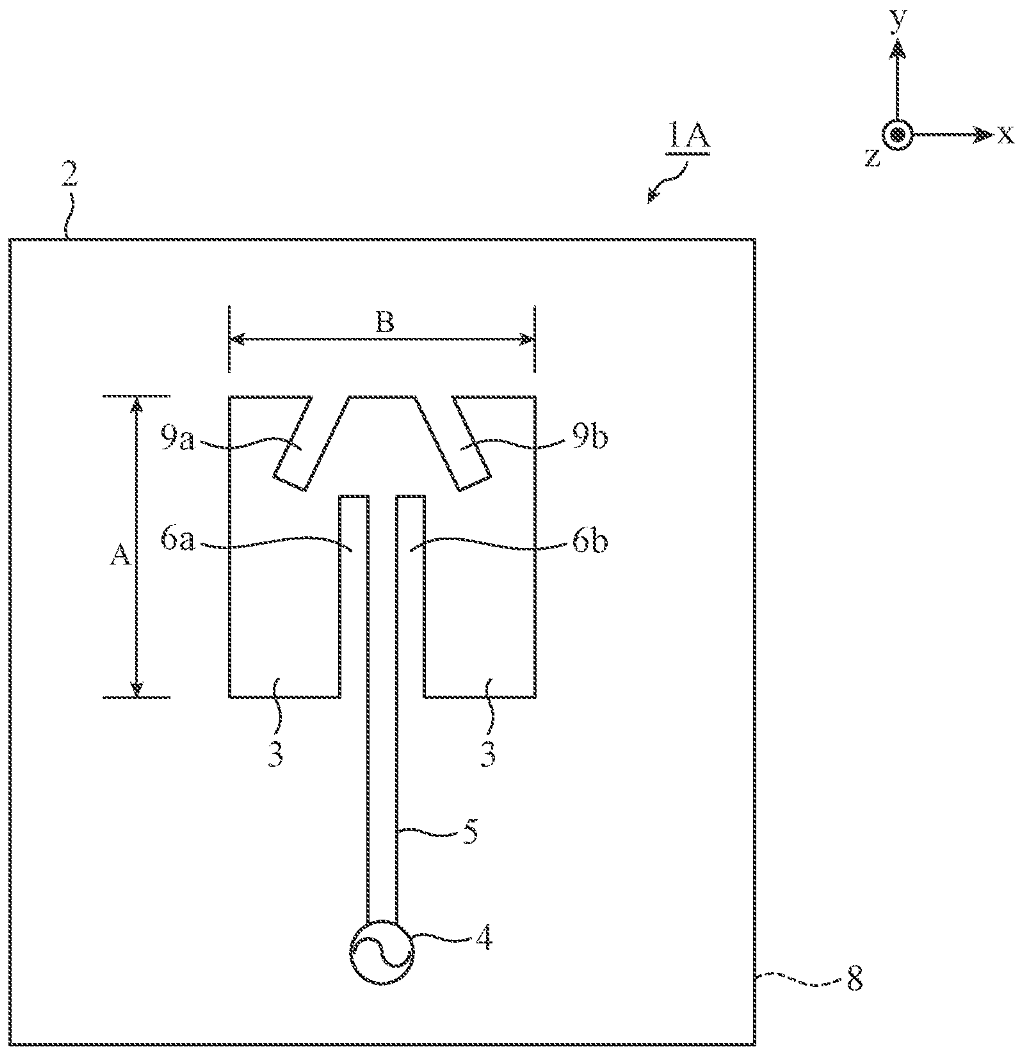
FIG. 6 is a plan view illustrating a modification of the antenna device according to the first embodiment.

FIG. 6 is a plan view illustrating an antenna device 1A that is a modification of the antenna device 1. In FIG. 6, the same components as those in FIG. 1 are denoted by the same reference numerals as those in FIG. 1. The antenna device 1A includes third slits 9*a* and 9*b* instead of the second slits 7*a* and 7*b*. The third slits 9*a* and 9*b* are a pair of notch portions extending in directions away from each other from the end of the radiation unit 3 on the side facing the side connected with the feed line 5 toward the feed line 5 when the first surface of the dielectric substrate 2 is viewed from above.

In FIG. 6, the third slits 9*a* and 9*b* are linear. Similarly to the second slits 7*a* and 7*b*, the mode of the electromagnetic field distribution generated in the radiation unit 3 can be adjusted by changing the sizes of the third slits 9*a* and 9*b*. As a result, even when the width B of the radiation unit 3 is narrow, the operation frequency band of the TM10 mode or a mode similar to the TM10 mode can be widened.

Note that, in the above description, the case where the radiation unit 3, the power feeding unit 4, and the feed line 5 are provided by the conductor pattern formed on the dielectric substrate 2 has been described, but the antenna devices 1 and 1A are not limited thereto. For example, the antenna device may be an antenna device in which the dielectric substrate 2 is an air layer, and the radiation unit 3 and the feed line 5 are made of metal conductors.

The radiation unit 3 included in the antenna devices 1 and 1A is not limited to a rectangular conductor pattern, and may be an elliptical or polygonal conductor pattern.

In the above description, the case where each of the first slits 6*a* and 6*b*, the second slits 7*a* and 7*b*, and the third slits 9*a* and 9*b* has a right-angled corner portion has been described, but the corner portion may be curved.

Although the case where the second slits 7*a* and 7*b* have a step shape of one step has been described, the second slits 7*a* and 7*b* may have a step shape of a plurality of steps. In addition, the step shape may be a shape in which a step of a part of the step shape is long. Furthermore, as long as the first surface has a shape that expands in directions away from each other toward the side to which the feed line 5 is connected when the first surface is viewed from above, the first surface may have an S-shaped curved shape instead of a step shape.

In addition, the antenna device according to the first embodiment may be a circularly polarized wave antenna including the radiation unit 3 in which a part of the outer shape is notched. Furthermore, a polarizer may be disposed in the radiation direction (+z direction) of the antenna device 1 or 1A to operate as a circularly polarized wave antenna.

In the above description, the configuration in which power is fed to the radiation unit 3 using the microstrip line provided on the first surface of the dielectric substrate 2 has been described. However, in the antenna device according to the first embodiment, for example, a configuration in which power is directly fed to the power feeding unit 4 using an RF connector may be adopted. Note that, in this case, the first slits 6*a* and 6*b* in the radiation unit 3 are unnecessary.

The antenna device according to the first embodiment may be configured to be fed by electromagnetic coupling. Another dielectric substrate may be disposed on the second surface (the surface in the −z direction in FIG. 1 or 6) of the dielectric substrate 2, and the electromagnetic wave input to the microstrip line formed on the dielectric substrate may be fed to the radiation unit 3 via an opening separately provided in the ground pattern of the second surface of the dielectric substrate 2.

The antenna device according to the first embodiment may be, for example, a device in which a plurality of antenna devices 1 or 1A are provided side by side in at least one of the x direction or they direction on the first surface of the dielectric substrate 2. The antenna device having this configuration can be used as a phased array antenna capable of scanning a beam in any direction by separately feeding the individual antenna devices.

Note that, in the above description, the case where the antenna device according to the first embodiment is used as a transmission antenna has been described, but the antenna device may be used as a reception antenna.

As described above, the antenna device 1 according to the first embodiment includes the feed line 5 provided on the first surface of the dielectric substrate 2, the radiation unit 3 provided on the first surface of the dielectric substrate 2 and connected with the feed line 5, the ground conductor 8 provided on the second surface opposite to the first surface of the dielectric substrate 2, and the second slits 7*a* and 7*b* extending in directions away from each other from the end of the radiation unit 3 on the side facing the side connected with the feed line 5 toward the feed line 5 when the first surface of the dielectric substrate 2 is viewed from above. Since the mode of the electromagnetic field distribution generated in the radiation unit 3 can be adjusted by changing the sizes of the second slits 7*a* and 7*b*, it is possible to achieve the wideband antenna device 1 having the radiation characteristics in which the level of the cross polarization is low.

Note that any component of the embodiment can be modified or any component of the embodiment can be omitted.

INDUSTRIAL APPLICABILITY

The antenna device according to the present disclosure can be used for, for example, a radar device.

REFERENCE SIGNS LIST

1, 1A: antenna device, 2: dielectric substrate, 3: radiation unit, 4: power feeding unit, 5: feed line, 6*a*, 6*b*: first slit, 7*a*, 7*b*: second slit, 8: ground conductor, 9*a*, 9*b*: third slit

The invention claimed is:

1. An antenna device, comprising:

a feed line provided on a first surface of a dielectric;

a radiator provided on the first surface of the dielectric and connected with the feed line;

a ground conductor provided on a second surface of the dielectric opposite to the first surface; and a pair of notches extending in directions away from each other from an end of the radiator on a first side opposite to a second side of the radiator to which the feed line is connected, toward the feed line when the first surface of the dielectric is viewed from above, wherein the pair of notches extends from the same side on the end of the radiator, and when a relative permittivity of the dielectric is $\varepsilon_r$, a width of the radiator in a direction orthogonal to the feed line is d, and a wavelength at a used frequency is λ, $d\sqrt{\varepsilon_r}/\lambda$, which is a value obtained by multiplying a square root of the relative permittivity $\varepsilon_r$ by the width d and dividing the wavelength λ, is less than 0.6.

2. The antenna device according to claim 1, wherein each notch has a step shape.

3. The antenna device according to claim 1, wherein each notch has a linear shape.

4. The antenna device according to claim 1 wherein the radiator has a rectangular shape.

5. An array antenna device, comprising a plurality of the antenna devices according to claim 1, wherein the plurality of the antenna devices is provided side by side on the first surface of the dielectric.

* * * * *